US010474710B2

(12) United States Patent
Zhang et al.

(10) Patent No.: US 10,474,710 B2
(45) Date of Patent: *Nov. 12, 2019

(54) SYSTEMS AND METHODS FOR GENERATING ISSUE NETWORKS

(71) Applicant: LexisNexis, a division of Reed Elsevier, Inc., Miamisburg, OH (US)

(72) Inventors: Paul Zhang, Centerville, OH (US); Sanjay Sharma, Mason, OH (US); Mark Wasson, Seattle, WA (US); Harry R. Silver, Shaker Heights, OH (US); David Steiner, Wilmington, OH (US)

(73) Assignee: RELX, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,027

(22) Filed: Feb. 27, 2018

(65) Prior Publication Data

US 2018/0189386 A1 Jul. 5, 2018

Related U.S. Application Data

(63) Continuation of application No. 15/091,967, filed on Apr. 6, 2016, now Pat. No. 9,940,389, which is a
(Continued)

(51) Int. Cl.
*G06F 16/35* (2019.01)
*G06F 16/93* (2019.01)
*G06F 16/34* (2019.01)

(52) U.S. Cl.
CPC .......... *G06F 16/35* (2019.01); *G06F 16/345* (2019.01); *G06F 16/93* (2019.01)

(58) Field of Classification Search
None
See application file for complete search history.

(56) References Cited

U.S. PATENT DOCUMENTS

| 7,735,010 | B2 * | 6/2010 | Zhang | G06F 16/382 |
| | | | | 715/713 |
| 7,778,954 | B2 * | 8/2010 | Rhoads | G06F 16/951 |
| | | | | 715/713 |

(Continued)

OTHER PUBLICATIONS

Feb. 11, 2019 Australian Patent Office Examination Report, Australian Patent Application No. 2014262676.

*Primary Examiner* — Debbie M Le
(74) *Attorney, Agent, or Firm* — Dinsmore & Shohl LLP

(57) ABSTRACT

Systems and methods for generating issue networks are disclosed. In one embodiment, a computer-implemented method of generating an issue network from a document corpus includes searching, using a computer, the document corpus for a set of documents discussing a starting issue, wherein the starting issue is one of a plurality of normalized issues defined by the document corpus. The method further includes determining a set of normalized issues discussed by the set of documents discussing the starting issue, wherein the set of normalized issues also includes the starting issue, and determining instances of co-occurrences of individual normalized issues of the set of normalized issues within individual cases of the set of documents. The method also includes linking individual normalized issues of the set of normalized issues based on their co-occurrences within the set of documents, wherein the linked individual normalized issues at least in part define the issue network.

20 Claims, 12 Drawing Sheets

Related U.S. Application Data continuation of application No. 13/890,740, filed on May 9, 2013, now Pat. No. 9,336,305.

(56) References Cited

U.S. PATENT DOCUMENTS

| | | | |
|---|---|---|---|
| 8,788,523 B2* | 7/2014 | Martin | G06F 17/2775 |
| | | | 707/771 |
| 2009/0112859 A1* | 4/2009 | Dehlinger | G06F 16/382 |
| 2011/0040768 A1 | 2/2011 | Shon et al. | |

* cited by examiner

SYSTEMS AND METHODS FOR
GENERATING ISSUE NETWORKS

CROSS-REFERENCE TO RELATED APPLICATIONS

This application is a continuation of U.S. patent application Ser. No. 15/091,967 entitled "Systems and Methods for Generating Issue Networks," filed on Apr. 6, 2016, which is a continuation of U.S. patent application Ser. No. 13/890,740 entitled "Systems and Methods for Generating Issue Networks," filed on May 9, 2013.

BACKGROUND

Field

The present specification generally relates to methods for identifying and organizing issues discussed within corpus of documents and, more particularly, to methods for extracting and organizing such issues identified in the document corpus into a structured issue network of interconnected normalized issues.

Technical Background

Documents within a corpus are often linked together by citations. For example, legal documents and scientific articles often cite to previous works to support a particular rule, proposition or finding. In the legal corpus context, an author of a judicial opinion often cites previous cases in support of his or her own legal statement or rule. In turn, these cited cases have themselves also cited and/or been cited by other cases in support of the proposition-in-question (and so on). Therefore, selected documents within the corpus are intrinsically linked together around particular issues, and these links can be manifested in the form of citation networks.

Researchers often search the corpus for documents that discuss a particular issue or topic. They will use the citations to move forward and backward within the corpus to find additional relevant documents. However, documents, such as legal documents, may discuss many different topics or legal issues. Further, a document may cite a document for many different reasons. Two citations pointing to the same document may cite to the same document for different reasons. Currently, the researcher does not know the particular issue or topic that a citing document is citing a cited document for based on the citation alone. The researcher must therefore sift through the many different cited documents. Further, issues may also be linked together by citation. A researcher may not be aware that particular issues are related. Because of this lack of understanding of how particular issues are connected or otherwise related, the researcher may not perform a thorough and complete investigation into the original issue or research topic.

Accordingly, a need exists for alternative methods of extracting and organizing normalized issues within a corpus of documents into an issue network describing the interconnectedness of normalized issues within the corpus of documents.

SUMMARY

According to one embodiment, a computer-implemented method of generating an issue network from a document corpus includes searching, using a computer, the document corpus for a set of documents discussing a starting issue, wherein the starting issue is one of a plurality of normalized issues defined by the document corpus. The method further includes determining a set of normalized issues discussed by the set of documents discussing the starting issue, wherein the set of normalized issues also includes the starting issue, and determining instances of co-occurrences of individual normalized issues of the set of normalized issues within individual cases of the set of documents. The method also includes linking individual normalized issues of the set of normalized issues based on their co-occurrences within the set of documents, wherein the linked individual normalized issues at least in part define the issue network.

According to another embodiment, a computer-implemented system for generating an issue network from a document corpus, wherein documents within the document corpus are linked by citations, thereby forming a citation network, includes a processor and a non-transitory computer-readable medium storing computer readable instructions. When executed by the processor, the computer readable instructions cause the processor to search the document corpus for a set of documents discussing a starting issue, wherein the starting issue is one of a plurality of normalized issues found within the document corpus, determine a set of normalized issues discussed by the set of documents discussing the starting issue, wherein the set of normalized issues also includes the starting issue, and determine co-occurrences of individual normalized issues of the set of normalized issues within individual cases of the set of documents. The computer readable instructions further cause the processor to link individual normalized issues of the set of normalized issues based on their co-occurrences within the set of documents, wherein the linked individual normalized issues at least in part define the issue network.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
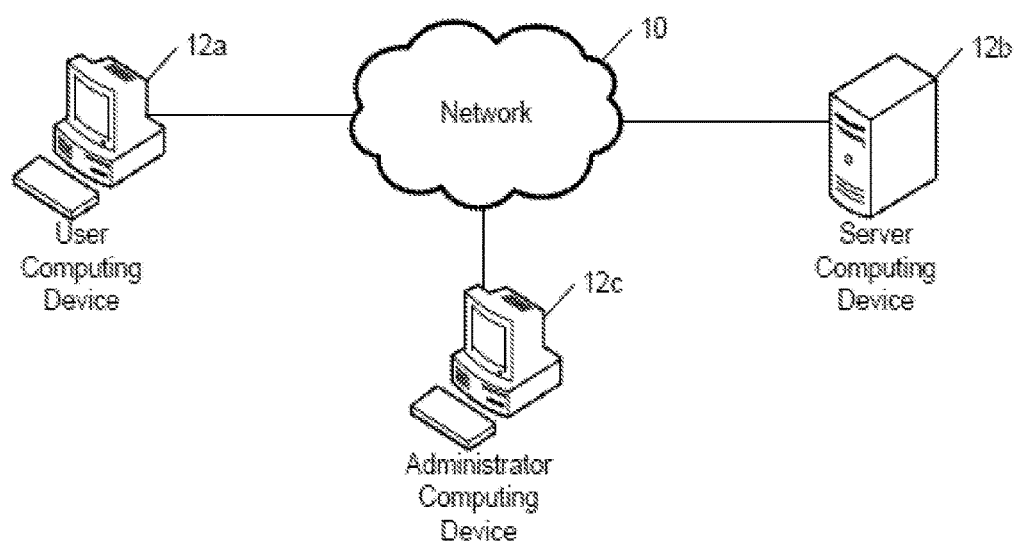
FIG. 1 depicts a schematic illustration of a computing network for a system for semantically pairing documents, according to embodiments shown and described herein.

Embodiments described herein are directed to systems and methods for organizing issues discussed in a corpus of documents into an issue network. Each document within the corpus may discuss one or more issues. Further, several individual documents within the corpus may discuss the same issue. Although each of the passages discussing the issue may be phrased differently, they may be semantically similar and related to the particular issue to which they discuss. There may be a large number of issues discussed by the documents within the corpus. In many cases, individual issues are related in some way to other issues discussed within the corpus. For example, a first issue discussed within a case may be commonly discussed in conjunction with a second issue in the same case. Therefore, these two issues may be strongly related. The co-occurrence of issues discussed in documents of the corpus may provide an indicator as to the strength of the relationship between issues.

The issue networks described herein comprise a plurality of issues extracted from the document corpus as interconnected nodes that are connected to each other based on co-occurrence within documents. The issue networks may provide a practitioner with a high-level view of how particular issues are related to one another, and thereby provide him or her with a thorough understanding of the particular issue he or she is interested in.

More specifically, embodiments utilize data-mining techniques to extract the issues from the corpus and store the issues in a repository, such as an issue library. Such extracted issues stored within the issue library may be used as "tokens" that act as nodes within the issue network, as described in detail below. The process by which issues are extracted, organized and stored is a data-driven and automatic process such that human intervention is minimal. In one embodiment, passages of individual documents are compared with other documents in the corpus to find semantically-similar passages. These passages, which are referred to herein as issue instances, are then linked in a one-to-one relationship and stored in a citation pairing metadata file. The citation pairing metadata is then traversed to extract grouped issues by chaining the same issue across all of the citation pairs. Information regarding the groups of issues may be stored in individual issue library entries as collections of issue instances. The issue library metadata entries may be configured as individual issue library metadata files, a single large xml file containing the issue library metadata entities, or entries stored in a database.

Metadata may be created and data-mined to generate connections between normalized issues. Such connections between normalized issues define an issue network, or a sub-network of a larger issue network. As described above, the co-occurrence of particular issues within a single case or document may indicate that there is a particular connection between the particular issues. For example, a second issue may logically flow from a first issue such that they are frequently discussed in an individual document, such as a legal case. Accordingly, the first and second issues may be related. The co-occurrences of normalized issues within the document corpus may be determined to define an issue network. Embodiments described herein utilize issues, such as legal issues, as a derived set of linguistic units derived from the document corpus as base units to model legal knowledge in a given legal system. The normalized issues, being data-driven and semantics-specific, may be viewed as a summary, or a condensed version of knowledge, such as legal knowledge, and may support deeper analysis of the principles included in the document corpus. Various embodiments of methods and systems for generating issue networks of issues discussed in a document corpus are described in greater detail herein.

As used herein, an "issue" (e.g., a legal issue) is a statement of belief, opinion, a principle, and the like. For example, in the legal context, an issue may be a rule of law. An issue usually contains one or more concepts. As used herein, a "concept" is a building block of an issue. Below is an example statement defining a legal issue:

"Thirteen-year-olds should not own a vehicle."

The above statement has at least three concepts: "thirteen-year-old," "vehicle," and "to own." Further, the statement is providing an opinion, a belief or a law and is therefore a legal issue. Below are additional examples of legal issues extracted from legal documents of a corpus:

a) "An inference is not reasonable if it is based only on speculation."
b) "To constitute the crime of robbery, however, the use of force must be motivated by an intent to steal."
c) ". . . a statute will not be given an interpretation in conflict with its clear purpose, and that general words used therein will be given a restricted meaning when reason and justice require it, rather than a literal meaning which would lead to an unjust and absurd consequence."
d) ". . . the initial question to be decided in all cases in which a defendant complains of prosecutorial misconduct for the first time on appeal is whether a timely objection and admonition would have cured them."

Concepts, on the other hand, are building blocks of discussion or issues as used herein. The concept "vehicle," for example, is used in all the following legal issues:

a) "A police office may approach a stopped vehicle and inquire about an occupant's well-being without intruding on the Fourth Amendment."
b) "In Nebraska, a vehicle can be a tool of the debtor's trade if the debtor uses it in connection with or to commute to work.
c) "State law governs the issue of security interests in motor vehicles."

d) "In Idaho, it is a felony to purport to sell or transfer a vehicle without delivering to the purchaser or transferee a certificate of title duly assigned to the purchaser."

As illustrated above, a "concept" may be used in discussion of different "issues." "Issues," in contract to "concepts" as used herein, are more specific and may serve as stand-alone statements relevant to the author's discussion and argument. Accordingly, issues, such as legal issues, being full statements, can better represent the semantics of documents. While concepts, topics and other linguistic units tell us what a discussion is generally about, issues tell us what the discussion is specifically saying.

At any given time, there is an unknown, finite number of issues being discussed within a document corpus. These issues form the body of knowledge of the document corpus. In the legal context, legal issues form the body of knowledge of a legal system, and represent principles of the law. Yet, for common law systems, this kind of knowledge is, to a large extent, embedded in case documents in the form of free texts and therefore undiscovered to a degree. This lack of comprehensive compilation of all laws in the legal system (as opposed to codified laws in continental legal traditions) imposes difficulties for legal professionals as well as information systems based on computers.

As described in detail below, embodiments of the present disclosure may extract important issues from a case law corpus (or other corpus) and store those issues in an issue library (e.g., a legal issue library). The building of the issue library relies on a data-mining process that collects issues in the corpus based on semantics-based network traversing. This traverse function links citations related to a starting issue during a recursive search in the network space. The issues that are found are then normalized and may be stored in the issue library. Embodiments also uncover the relationship between individual issues themselves, and form a network using issues as the base units of the network. The issue network may disclose relationships between seemingly disparate issues, which may provide an opportunity for a legal practitioner to generate additional legal arguments.

Although the embodiments are described herein in the context of a corpus of legal documents, it should be understood that embodiments are not limited thereto. For example, the systems and methods described herein may be utilized to create issue networks for legal documents, scientific research documents, news articles, journals, online data (e.g., Wikipedia articles) and any other type of large corpus of documents where documents are linked by citations.

Referring now to the drawings, FIG. 1 depicts an exemplary computing network, illustrating components for a system for generating issue libraries and issue networks from documents within a corpus, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12*a*, a server computing device 12*b*, and an administrator computing device 12*c*.

The user computing device 12*a* may be used to input one or more documents into an electronic document corpus as well as initiate the creation of metadata, such as issue-library metadata and issues-by-case metadata described below. The user computing device 12*c* may also be utilized to perform other user functions. Additionally, included in FIG. 1 is the administrator computing device 12*c*. In the event that the server computing device 12*b* requires oversight, updating, or correction, the administrator computing device 12*c* may be configured to provide the desired oversight, updating, and/or correction.

It should be understood that while the user computing device 12*a* and the administrator computing device 12*c* are depicted as personal computers and the server computing device 12*b* is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12*a*, server computing device 12*b*, and administrator computing device 12*c* may represent a plurality of computers, servers, databases, etc.

Figure 2:
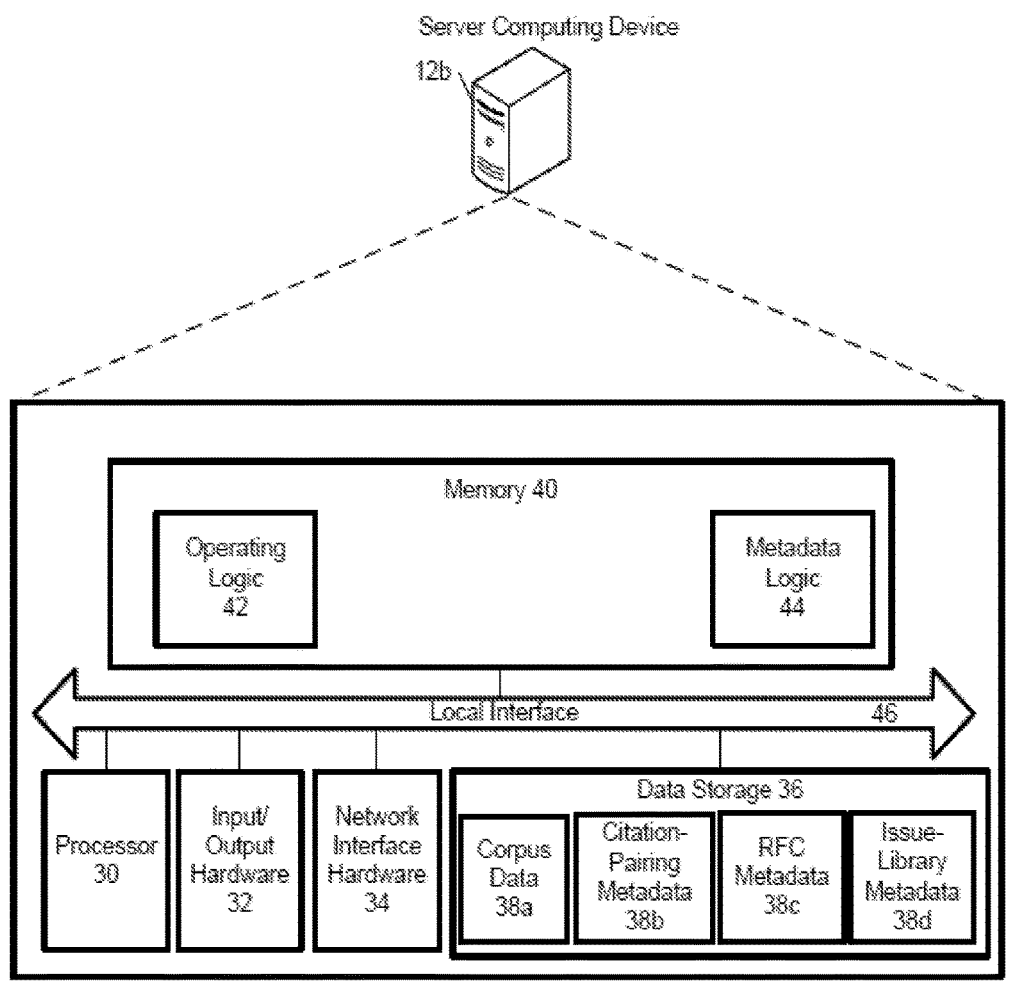
FIG. 2 depicts a schematic illustration of the server computing device from FIG. 1, further illustrating hardware and software that may be utilized in performing the semantics-based citation pairing functionality, according to embodiments shown and described herein.

FIG. 2 depicts the server computing device 12*b*, from FIG. 1, further illustrating a system for generating issue libraries and networks and/or a non-transitory computer-readable medium for generating issue libraries and networks embodied as hardware, software, and/or firmware, according to embodiments shown and described herein. While in some embodiments, the server computing device 12*b* may be configured as a general purpose computer with the requisite hardware, software, and/or firmware, in some embodiments, that server computing device 12*b* may be configured as a special purpose computer designed specifically for performing the functionality described herein.

As also illustrated in FIG. 2, the server computing device 12*b* may include a processor 30, input/output hardware 32, network interface hardware 34, a data storage component 36 (which stores corpus data 38*a*, citation-pairing metadata 38*b*, reasons-for-citing metadata 38*c*, and issue-library/network metadata 38*d*), and a memory component 40. The memory component 40 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42 and metadata logic 44 (each of which may be embodied as a computer program (i.e., computer readable instructions), firmware, or hardware, as an example). A local interface 46 is also included in FIG. 2 and may be implemented as a bus or other interface to facilitate communication among the components of the server computing device 12*b*.

The processor 30 may include any processing component configured to receive and execute computer readable instructions (such as from the data storage component 36 and/or memory component 40). The input/output hardware 32 may include a monitor, keyboard, mouse, printer, camera, microphone, speaker, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12*b* and may be configured to store one or more pieces of data for access by the server computing device 12*b* and/or other components. As illustrated in FIG. 2, the data storage component 36 stores corpus data 38*a*, which in at least one embodiment, includes legal and/or other documents that have been organized and indexed for searching. The legal documents may include case decisions, briefs, forms, treatises, etc. Other documents may also be stored, such as scientific documents. Similarly, citation-pairing metadata 38b generated by the metadata logic 44a may be stored by the data storage component 36 and may include information relating to the semantically linked documents. Reasons-for-citing metadata 38c may also be stored by the data storage component 36 and may include data related to the text excerpts corresponding citations present in documents of the corpus. Issue-library/network metadata 38d (e.g., issue-library metadata and issues-by-case metadata) may also be stored by the data storage component 36 and may include data related to documents within the corpus that are organized by issue.

Included in the memory component 40 are the operating logic 42 and the metadata logic 44. The operating logic 42 may include an operating system and/or other software for managing components of the server computing device 12b. Similarly, the metadata logic 44 may reside in the memory component 40 and may be configured to facilitate electronic generation of the citation-pairing, reasons-for-citing, issue-library, and issues-by-case metadata as described in detail below. The metadata logic 44 may be configured to compile and/or organize metadata to enable additional user applications, such as electronic document search and retrieval, organization of the documents within the corpus by issue, and generation of one or more networks of issues.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12b may include similar hardware, software, and/or firmware.

Figure 3A:
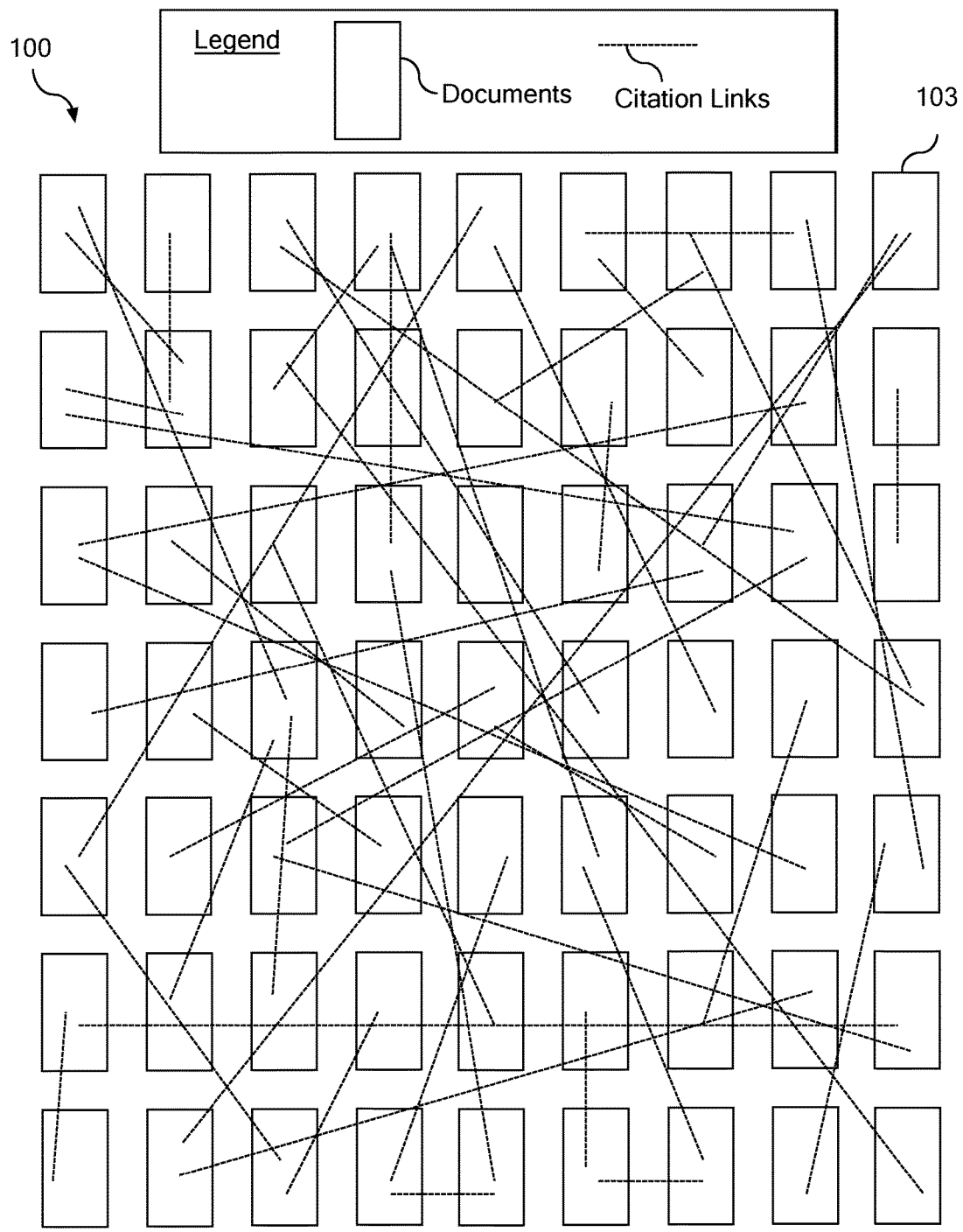
FIG. 3A depicts a schematic illustration of a document corpus according to one or more embodiments shown and described herein.

Referring initially to FIG. 3A, a corpus 100 of documents is illustrated. Within the corpus 100 are individual documents 103 that are linked via citations. For example, a citing document may include a citation that references a particular passage or text area of a cited document. The cited document may further cite other documents and so on. The citations and linked documents form a citation network within the corpus 100. It should be understood that the corpus 100 may include any number of documents 103.

The corpus 100 of documents may be a legal corpus comprising many individual judicial opinions. In some common-law countries, such as the United States, the legal system is based on stare decisis, wherein judges are obligated to follow the precedents established by prior judicial decisions. When preparing a judicial or legal opinion, the judge or person preparing the opinion must cite to documents to support particular rules, statements and facts. A citation is commonly located proximate to a reason-for-citing, i.e., the string of text that is located near the citation and suggests the reason for the particular citation to the cited document. Legal research is often performed by searching prior and subsequent cases of a legal issue based on citations located within each document. Therefore, knowing and understanding the reasoning why cases are linked together within the corpus 100 may be beneficial for efficient legal research.

Figure 3B:
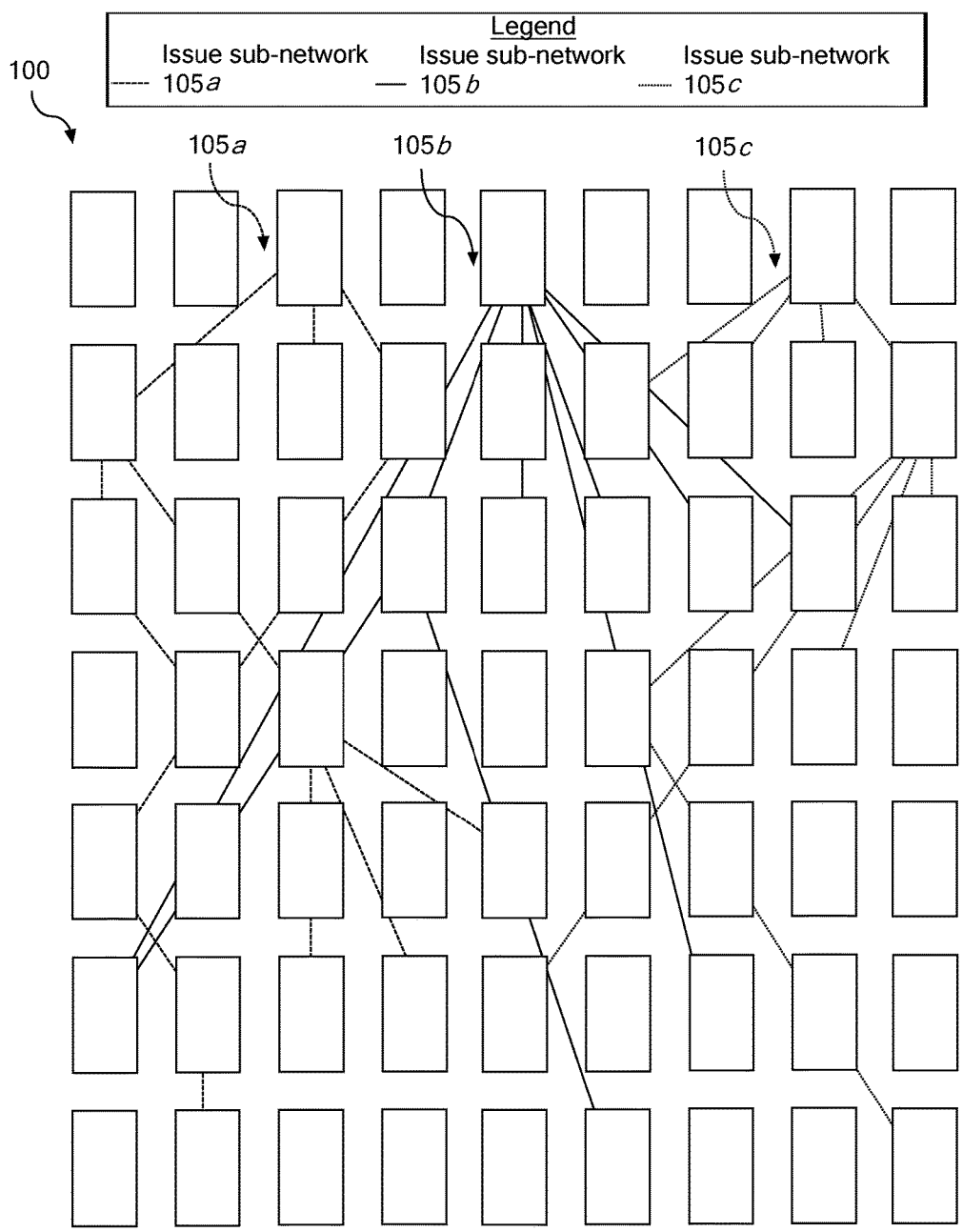
FIG. 3B depicts a schematic illustration of groups of documents having semantically-similar passages within a document corpus according to one or more embodiments shown and described herein.
Figure 3C:
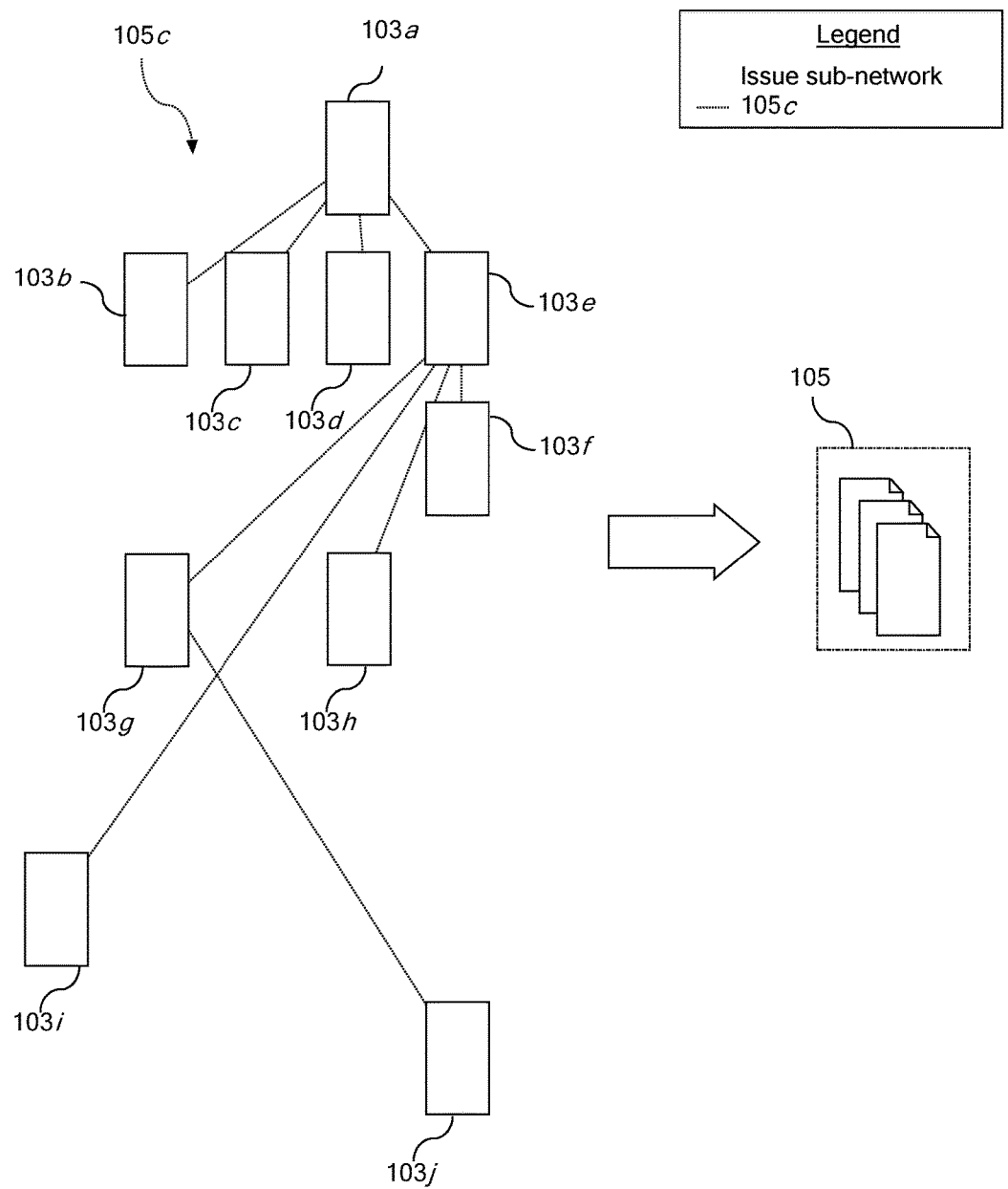
FIG. 3C depicts a schematic illustration of a group of documents associated with an issue and an issue library metadata entity according to one or more embodiments shown and described herein.

Referring now to FIGS. 3B and 3C, an example of a plurality of semantics-based sub-networks 105a-c of issue instances discussed in cases that are each relevant to a particular issue or sub-issue exists within the corpus 100 is illustrated. Issue instances are passages within the individual documents of the corpus 100 that discuss issues. Although issue instances may be phrased differently, they may have the same semantic meaning. For example, there may be many ways to describe a particular rule of law; however, each description of the particular rule of law, although different, may be semantically the same. Issue instances cited within the documents of a corpus that discuss a particular issue form a sub-network that is defined as a collection of issue instances that discuss the particular issue.

FIG. 3C illustrates a plurality of documents (each numbered 103) that cite and/or are cited for a particular issue. The issue instances within the documents schematically illustrated in sub-network 105a are related to one particular issue, the issue instances within the documents schematically illustrated in sub-network 105b are related to another issue, and the issue instances within the documents schematically illustrated in sub-network 105c are related to yet another issue. For example, the individual issue instances present within a particular sub-network may be related to the issue as to when it is appropriate for new arguments to be introduced on appeal. These issue instances may form a collection of issue instances relevant to the issue as to when it is appropriate for new arguments to be introduced on appeal.

Many issues within the corpus have semantic relationships amongst themselves, or interact with each other semantically. As described in more detail below, data-mining and semantics-based traversing are used to discover these sub-networks and organize them into issues that form an issue library. Embodiments determine how such issues within the issue library are connected and related amongst themselves to define an issue network. The issue network uses the issues themselves as interconnected nodes within a network based on their co-occurrences within cases of the corpus 100, FIG. 3C illustrates a sub-network 105c of cases that has been extracted from the corpus 100. The sub-network 105c is composed of a plurality of documents 103a-j that each has at least one passage that is semantically similar to a particular issue (i.e., an issue instance). Information regarding the extracted issue, the document citations, and semantically-similar passages may then be written and stored into an electronic issue library metadata entity 105. The issue library is composed of issue library metadata entities that are generated from the corpus. In one embodiment, the issue library metadata entries may be configured as individual issue library metadata files. Alternatively, all of the issue library metadata entries may be stored together in a large xml file or a database.

The issue library metadata entity contains the issue-related information that may be utilized by software programs to perform various functions. As described in detail below, the issue library metadata entities may comprise an issue text statement that states the particular issue, citation information regarding the cases that discuss the issue, and issue instances of the discussion of the particular issue. The issue instances (i.e., the text passages within the documents that discuss the particular issue) are identified and represented in the issue library by a unique identification number and a standard issue text statement. Therefore, the issue library metadata provides normalization to the issues that are extracted from the corpus by associating individual issue instances with an issue having an identification number. Normalization of the many issues discussed within the document corpus allows the issues to be searched and organized into a network. The many instances of the particular issue may be normalized in a single unit of the issue library metadata. Those units or entries may then be utilized for further processing.

Other metadata may also be created. For example, the issues-by-case metadata described in detail below includes normalized issue vectors for all or some of the cases within the corpus. More specifically, the issues-by-case metadata may include information regarding the various normalized issues discussed by each document in the corpus. The issue library metadata and the issues-by-case metadata may be stored separately from the documents of the corpus.

As described in more detail below, normalized issues extracted from the corpus may be used as units in a network to depict the relationships between various issues. Issues, such as legal issues in the legal context, are connected by citations and other semantic elements. When they are used as the basic units to form networks, much of the legal knowledge that has not been easily seen may be revealed.

The corpus may be data-mined to discover various issues that are discussed within the corpus. Use of the data-mining techniques described herein greatly enhances the ability to organize the corpus (which may consist of millions of documents) by various issues. Embodiments may be used to develop an issue library for an existing corpus as well as continuously and automatically add documents into the relevant issue library metadata entities as they are added to the corpus. For example, in a legal corpus, judicial opinion documents that are issued by a court may be analyzed as described herein and then respective passages may be added to the proper issue library metadata entities. Embodiments described herein also take normalized issues extracted from a document corpus and extract one or more issue networks based on the interconnectedness of the normalized issues within the corpus. For example, a first issue within a first document may be discussed extensively in conjunction with a second issue in a large number of other documents in the corpus. Therefore, the connection between the first issue and the second issue may form a branch within an issue network or sub-network of an issue network. Embodiments described herein extract an issue network (and/or issue sub-networks) from the corpus to reveal connections between issues that may otherwise not be apparent.

Described below is an exemplary method for extracting issues from a corpus, normalizing the extracted issues, and then generating an issue library using various metadata. Next, an exemplary method of generating an issue network from extracted and normalized issues is described.

Figure 4:
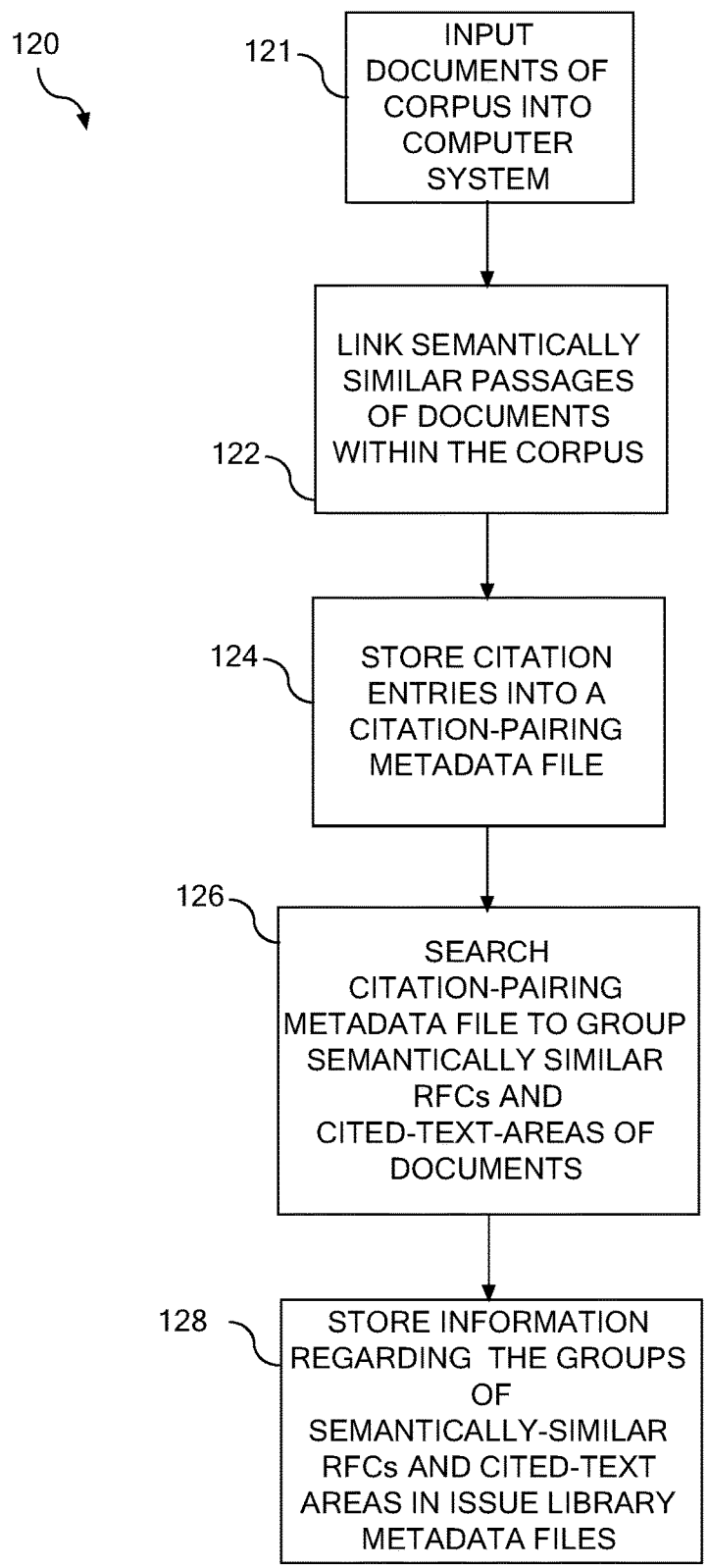
FIG. 4 depicts a flowchart illustration of a process for storing information regarding semantically-similar passages within documents into a plurality of issue library metadata entities.

FIG. 4 is a flowchart 120 that illustrates an exemplary data preparation process for extracting issues from the corpus and storing issue-related information into individual issue library metadata entities. At block 121, one or more documents of the corpus are entered into a computer system. At block 122, passages within individual documents are linked with semantically-similar passages of cited documents. Each document within the corpus may comprise one or more citations that link the citing document to one or more cited documents. A reason-for-citing is commonly present near the citation and suggests the particular reason for the citation. The reason-for-citing is often related to a particular issue of discussion. The citation within the citing document commonly refers to a reason-for-citing or a cited-text-area in a cited document.

A cited-text-area within a cited document may or may not have an associated citation. For example, a drafter of a judicial opinion may cite to a previous judicial opinion that is the originator of a particular rule the drafter wishes to incorporate into his or her judicial opinion. The rule in the previous judicial opinion most likely does not contain a citation. However, it is common for citing documents to cite previous reasons-for-citing in cited documents that have associated citations. Therefore, it is to be understood that a reason-for-citing is a passage of text that has an associated citation and a cited-text-area is a passage of text that does not have an associated citation. Reasons-for-citing and cited-text-areas in a cited document may be treated as equivalents according to the embodiments described herein.

As described in more detail below with respect to FIGS. 6-9, links are formed between passages of a citing document and the semantically-similar passages of the cited document(s) that it cites, thereby generating one-to-one relationships between the passages. In one embodiment, the passages that are linked semantically are the reasons-for-citing and cited-text-areas of the citing and cited document. For example, a link may be formed between a reason-for-citing of the citing document with the reason-for-citing or cited-text-area of a cited document that is most semantically similar to the reason-for-citing of the citing document. These semantic links may be generated as described below for each (or substantially each) reason-for-citing within the documents of the corpus.

At block 124, information regarding the links for the documents in the corpus are stored as individual citation entries in a citation-pairing metadata file. The citation-pairing metadata file contains one-to-one pairing information between a reason-for-citing of a citing document and a reason-for-citing/cited-text-area of a cited document. As an example and not a limitation, the citation-pairing metadata file may contain information such as a citing document identifier, a reason-for-citing, a cited document identifier, and a cited case reason-for-citing or cited-text-area. The citation-pairing metadata file may provide a single repository for the linked passages that may be easily accessed and utilized by various applications. Examples of citation-pairing metadata files and corresponding citation entries are described below with respect to FIG. 7.

The citation-pairing metadata file may be used to extract issues from the corpus. At block 126, the citation network of the corpus is traversed by searching the citation-pairing metadata file for passages that are semantically similar to one another. Semantically-similar passages that discuss the same issue are grouped together to form a sub-network of the citation network (e.g., sub-networks 105a-b illustrated in FIG. 3B). Text strings associated with the semantically-similar passages are retrieved based on their citation links. A depth-first search of the citation-pairing metadata file is performed to search all nodes (i.e., a discussion of an issue within a document) of the citation network that discuss the same or similar issue.

One exemplary method of traversing the citation network to determine documents having semantically-similar passages is described in U.S. Pat. No. 7,735,010, which is incorporated herein by reference as though fully set forth in its entirety. Generally, the exemplary method comprises performing a depth-first search of the semantic links in the citation-pairing metadata file based on either a user-specified issue represented by a reason-for-citing or a headnote, or an automatically-generated issue. A headnote is text that summarizes an issue found in a document and is expressed in the actual language used in the document. To extract entries for the issue library, an automatically-generated issue may be determined by systematically or randomly selecting a reason-for-citing in a citing or cited document and searching for passages in documents that are semantically similar to that selected reason-for-citing. At each node a list of new reasons-for-citing candidates or headnotes is returned, and each of these new reasons-for-citing or headnotes is used to search for more candidates in a similar manner. The retrieved citations and corresponding semantically-similar passages are used to form the sub-network and are grouped together to be included under the corresponding metadata entries for the issue library.

Information regarding the groups of semantically-similar passages and documents may be stored in a plurality of issue library metadata entities at block 128. In one embodiment, each issue library metadata entity may be associated with one particular issue. Alternatively, multiple issues may be stored in a single issue library metadata entity. For example, groups of related issues may be stored in one issue library metadata entity. The process illustrated in FIG. 4 may be repeatedly executed to exhaustively mine the corpus to extract issues, group passages and documents by issue, and store such passages and documents in issue library metadata entities. The process may also be performed each time a new document is added to the corpus to extract the issues that the document discusses and place such issues in the appropriate issue library metadata entity.

The above-described process allows cases to be grouped under the same issue library metadata entity and therefore the same issue identifier even when the language of the discussion is varied. The following excerpts (i.e., issue instances) from different cases show this kind of variation:

a) "Robbery is 'the felonious taking of personal property in the possession of another, from his person or immediate presence, and against his will, accomplished by means of force or fear.' The intent to steal must be formed either before or during the commission of the act of force."

b) "According to Green, under California law, the crime of robbery cannot be committed if the intent to steal is formed after the murder."

c) "Defendant testified that he had not thought about stealing any of Mullins' property until after the assault was completed. If defendant had not harbored a larcenous intent before or during the assault, the taking was theft rather than robbery."

d) "No robbery occurs when the intent to steal is formed after the use of force."

e) "Defendant claims his various admissions go to the killing and not the robbery. Further, he argues there was no evidence showing he formed the intent to rob before he killed the victim."

f) "Defendant's claim of insufficient evidence is premised on a misunderstanding of the immediate presence element of robbery. So long as defendant formed the intent to take the Brandts' possessions before killing them, he was properly convicted of robbery."

Despite the variation in linguistic expression, these passages representing issue instances are clearly statements of the same legal issue regarding the nature of the intent required to support a charge of robbery, and may be duly stored within a library metadata entry. In this way, instances of the same issue are normalized, and collapsed into the same issue identifier with or without links to their original cases. This allows cases or documents to be grouped under the same issue identifier within a library metadata entry even when the langue of discussion is varied. In the legal context, each legal issue thus extracted may be considered a small piece of law in the particular legal system. The collection of all issues may be seen as a summary or condensed version of legal knowledge of the legal system.

The format and contents of the issue library metadata entities may be configured in a variety of formats. One example of an issue library metadata entity is provided below in Table 1 below. It should be understood that the exemplary issue library metadata entity below is for illustrative purposes only and that embodiments may have more or fewer entries, as well as different types of entries. Although the issue library metadata entities may be constructed in a table, a table is being used herein for ease of illustration and discussion and not as a limitation.

TABLE 1

| Metadata Field | Exemplary Metadata Field Entry |
| --- | --- |
| Issue Identifier: | I-000001 |
| Display Issue Text: | "It is well settled that rescission cannot be effected without an offer to restore, the only exception to this rule being where the vendee has received nothing of value. |
| Index Terms: | restore, rescission, . . . . . . |
| Taxonomy Topic: | "Rescission & Redhibition" |
| Issue Instance 1: | "He must give prompt notice of his election to rescind the contract, and he must restore or offer to restore everything of value which he has received thereunder." (*Taylor* v. *Hammel*, 39 Cal. App. 205) |
| Issue Instance 2: | "Exceptions to the general rule that one seeking rescission in equity must as a condition precedent to action promptly rescind and restore or offer to restore what he has received are cases in which by reason of special circumstances it has on general equitable principles become unfair to impose such a condition of relief." (*Walsh* v. *Majors*, 4 Cal. 2d 384) |
| Issue Instance 3: | ". . . there can be no rescission of an executed contract, upon the ground of fraudulent misrepresentation, without restoration before suit by the party seeking to rescind of everything of value which he had received from the other party under the contract, or a bona fide offer to restore." (*Kelley* v. *Owens*, 120 Cal. 502 |
| Issue Instance 4: | . . . . . . |

Referring to Table 1, the issue identifier field points to a particular issue that has been extracted from the corpus as described above. The issue identifier may be a unique code that corresponds to the particular issue. Each issue may be assigned a unique issue identifier. The issue identifier "I-000001" indicates an issue discussed within the corpus. It should be understood that embodiments described herein are not limited to the issue identifier format illustrated in Table 1. For example, the issue identifier may be a numeric code, an alphabetic code, or an alphanumeric code. Any number of formats may be utilized for the issue identifier.

The display issue text field contains a string of text that is associated with the particular issue of the issue identifier. In one embodiment, the display issue text string is an actual string of text from a document in the corpus that best represents the particular issue. The display issue text may be selected from all of the text strings (e.g., reasons-for-citing and cited-text-areas) of the documents that discuss the particular issue. These text strings are referred to as issue instances. As an example and not a limitation, one hundred cases may discuss a particular issue and be grouped together. The text strings that discuss the issue may be evaluated such that a single text string is selected from the one hundred issue instances in the group that best represents the particular issue. The selected text is designated as the display issue text and stored in the display issue text field of the issue library metadata entity. The display issue text may be the text that is presented to an end-user to provide a summary of the particular issue, for example. The display issue text may be selected automatically based on linguistic and other rules. For example, the issue instances may be evaluated and scored based on the number of key terms within the text string, the length of the text string, the date of document, etc. The display issue text may be selected in other manners as well, such as manually by a person.

The index terms field contains key terms that are relevant to the particular issue. The index terms may be generated automatically by comparing the text strings of the issue instances with a list of key terms and extracting those terms that are frequently contained in the text strings. The index terms may also be entered manually by a person who evaluates the issues and determines which terms are to be used as the index terms.

Figure 5:
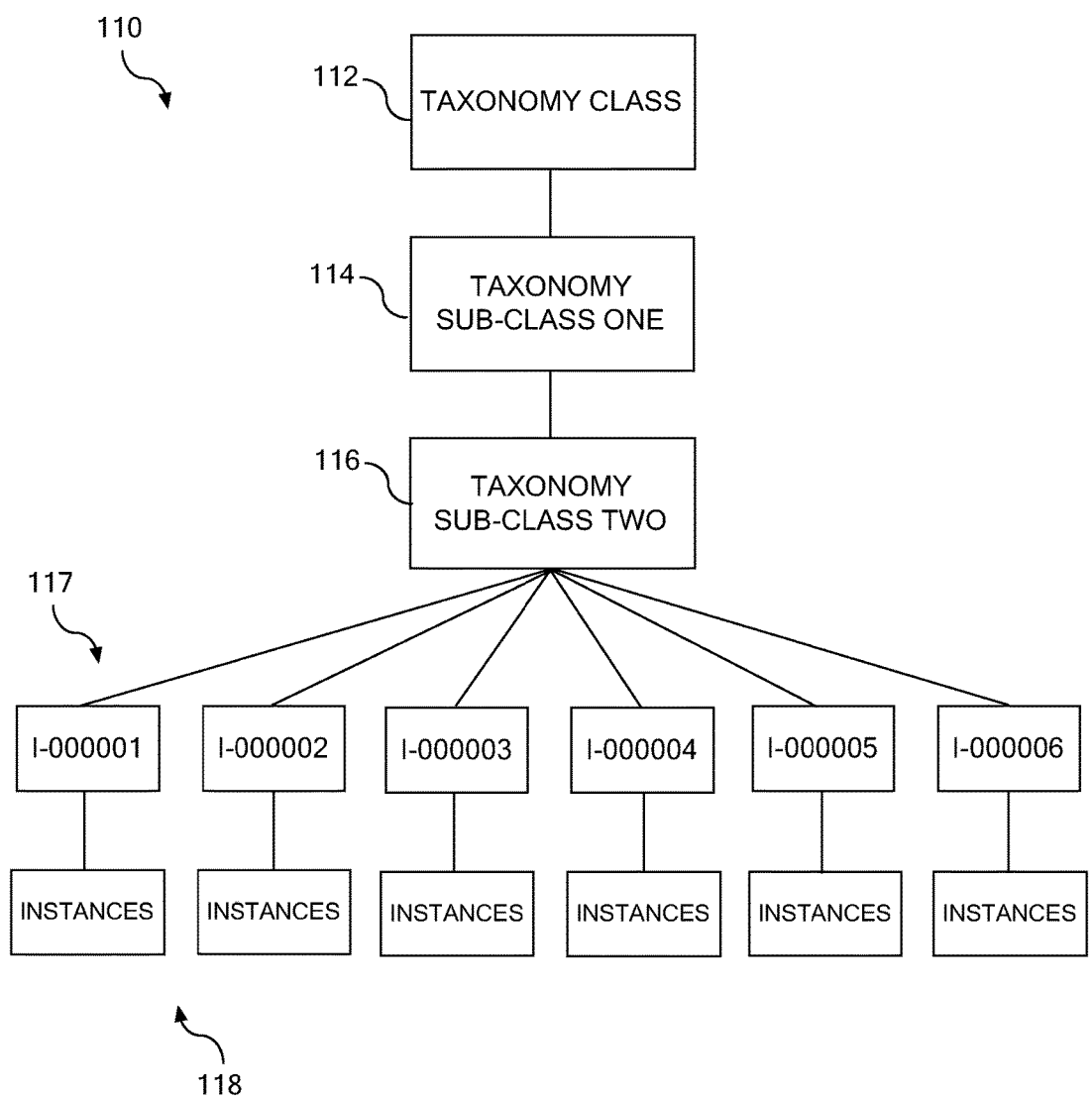
FIG. 5 depicts a schematic illustration of a taxonomy structure of a plurality of issues within the document corpus according to one or more embodiments shown and described herein.

In some embodiments, the particular issues of the corpus may be placed within a taxonomy structure that organizes the corpus. The taxonomy specifies hierarchically-structured topics. The taxonomy may be organized by a tree of taxonomy topics. Each topic in the taxonomy may be seen as a place to host one or more issues. FIG. 5 illustrates a taxonomy structure that comprises three topics: taxonomy topic 112, taxonomy sub-topic one 114, and taxonomy sub-topic two 116. It should be understood that more or fewer taxonomy topics may be utilized depending on the concepts discussed in the corpus. As an example and not a limitation, taxonomy topic 112 may be titled "Contracts," taxonomy sub-topic one may be titled "Remedies," and taxonomy sub-topic two may be titled "Redhibition" in a legal corpus. It should be understood that any other taxonomy topics and sub-topics may be present within the taxonomy structure.

The issue instance fields contain information relating to the instances where the particular issue is discussed in the documents. The issue instances are text strings of reasons-for-citing and/or cited-text-areas that are related to the particular issue. In one embodiment, as depicted in Table 1, the issue instance fields may be populated with the actual text of the issue instance in the documents. The issue instance fields, in a legal context, may therefore contain the text of the cited rules as written in the documents. In another embodiment, the issue instance fields may contain an issue instance identifier that points to an entry in another metadata file that contains the actual text of the reason-for-citing or cited-text-area. As an example and not a limitation, a reason-for-citing metadata file may be used to store the text associated with reasons-for-citing within documents of the corpus. One embodiment of a reason-for-citing metadata file is described below with respect to FIG. 7.

The issue instance fields may also contain a link to the actual document that the issue instance is related to. The issue instance may be accessed by an end-user or a software program to retrieve the document that the particular issue instance is from. In one embodiment, the actual citation may be included in the issue instance field. In another embodiment, a document identifier may be provided that points to the location of the actual document for retrieval.

The issue library metadata entity may also contain additional information that is not depicted in Table 1. For example, the issue library metadata entity may contain information regarding a cited statute or statutes that are related to the particular issue, as well as a cited article or articles, such as law review articles for example, that discuss the particular issue. Links to the most frequently cited documents for the particular issue may also be included in the library metadata file, as well as documents that are held in high regard by a community and, in the legal context, Shepard's treatment information regarding the particular issue.

In this manner, one or more issues may be extracted from the corpus and then normalized as a library metadata entry.

Referring once again to FIG. 5, in some embodiments, the various extracted issues may be organized under a taxonomy structure 110 that defines an issue library. FIG. 5 illustrates one example of a portion of such a taxonomy structure. The nodes 117 positioned under taxonomy sub-topic two 116 represent various issues extracted from the corpus. These issues are relevant to the particular taxonomy topic and sub-topics- that are depicted. Using the example from above, the issues represented by nodes 117 may be related to Contracts Law→Remedies→Rescission & Redhibition. Each node has a unique issue identifier associated therewith. It should be understood that the illustrated issue identifiers of FIG. 5 are for demonstrative purposes only. Referring to the example of Table 1 above, issue I-000001 is directed toward rescission and may therefore be placed under the taxonomy topic or sub-topic "Rescission & Redhibition."

A plurality of issue instances 118 are positioned under the nodes 117 representing the issue instances. Each box under an issue identifier may represent one or more issue instances, as illustrated in Table 1. For example, some issues may have as many as thousands or tens of thousands of associated issue instances. Other issues may only have a few associated issue instances.

An exemplary process for the generation of the citation-pairing metadata file referenced above as well as its operation will now be described hereinbelow. The citation-pairing metadata file assists in the creation of the issue library metadata entities described above.

Figure 6:
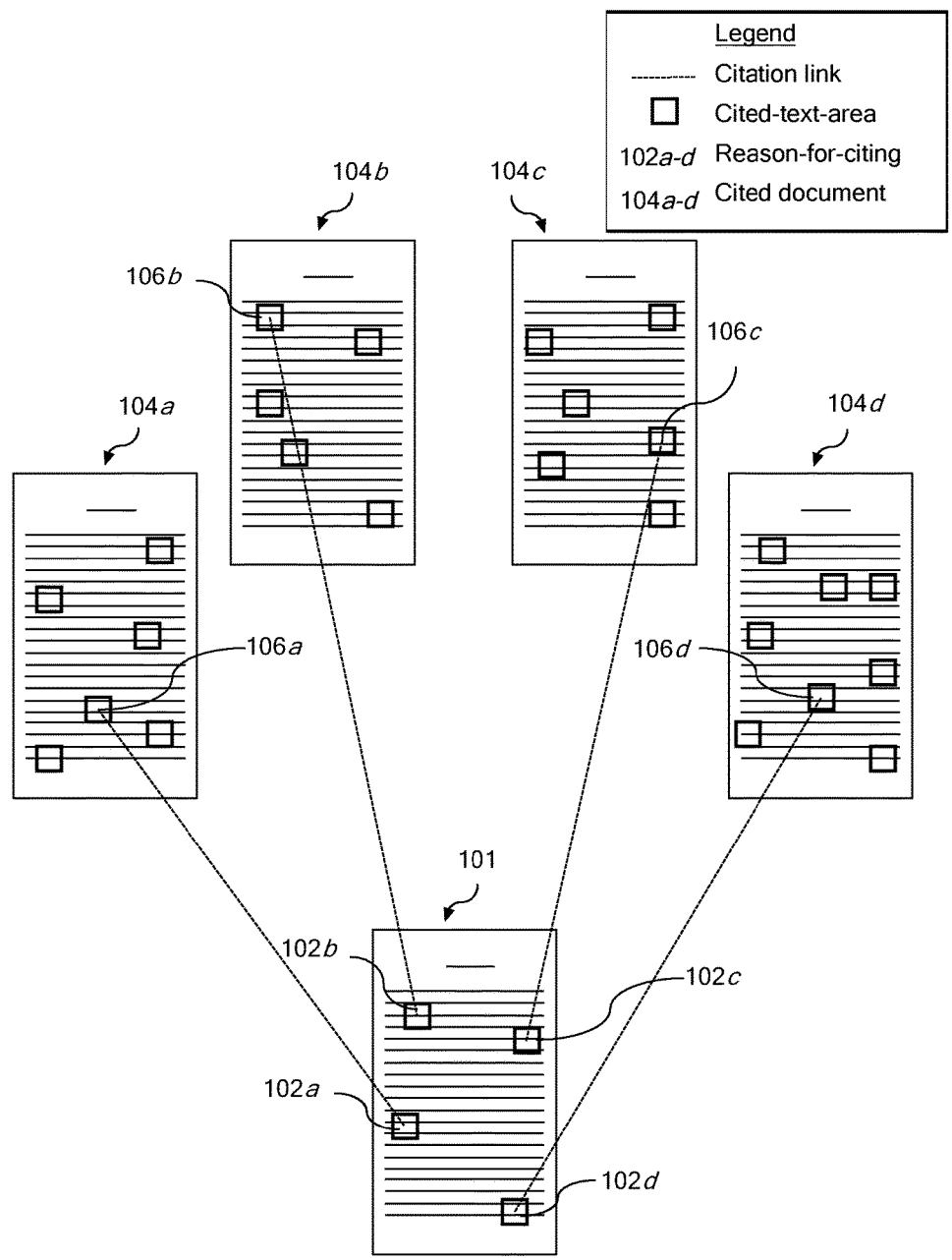
FIG. 6 depicts a schematic illustration of a relationship between a citing document and a plurality of cited documents according to one or more embodiments shown and described herein.

FIG. 6 illustrates a citing document 101 and a plurality of cited documents 104a-d. The illustrated citing document 101 has four citations and corresponding reasons-for-citing 102a-d. Each reason-for-citing 102a-d is located proximate to a citation within the cited document 101. The citations link the citing document 101 to the plurality of cited documents 104a-d. The drafter of the citing document 101 has a particular reason for citing each cited document 104. For example, the drafter of the citing document may wish to incorporate a particular rule from cited document 104a into the cited document. The cited-text-area 106a of cited document 104a may recite the particular rule that corresponds with the reason-for-citing 102a of the citing document 101. The reason-for-citing 102a and cited-text-area 106a may be semantically similar. As illustrated, the citing document 101 and cited document 104a are linked at both a document level and a passage level. Similarly, reason-for-citing 102b is semantically linked to cited-text-area 106b of cited document 104b, reason-for-citing 102c is semantically linked to cited-text-area 106c of cited document 104c, and reason-for-citing 102d is semantically linked to cited-text-area 106d of cited document 104d.

However, the citations only identify the particular cited documents cited by a citing document, and not the particular text area or passage that is being cited. Current pairing techniques are asymmetric because a reason-for-citing is at the citing document end of the link, but at the other end it is the whole case: Case_X:Reason_For_Citing_a→Case_Y. Embodiments described herein enable cases to be linked at the passage level on both ends of the link and store citation entries within a citation-pairing metadata file that contains information regarding the semantically linked pairing.

The citation-pairing metadata file specifies the citation relationship between two cases at the semantic level (i.e., at the passage level). The citation-pairing metadata file contains a citation entry for each reason-for-citing of every document within the corpus (or a select group of documents within the corpus). Below is an example of a citation entry format of one embodiment:
CitingCaseID:Reason-For-CitingID::CitedCaseID:CitedTextAreaID:SimilarityValue The CitingCaseID and CitedCaseID fields of the above example are a citing document identifier and a cited document identifier, respectively. These identifiers contain information that point to particular documents within the corpus. Within each citing document are a plurality of reasons-for-citing or rules. For example and not limitation, the citing document may have 20 citations and therefore 20 corresponding reasons-for-citing. The Reason-For-CitingID field is a reason-for-citing identifier that points to the particular reason-for-citing within the citing document. For example, the reason-for-citing identifier may point to the fifth reason-for-citing in the citing document, which may be for a particular rule of law.

A plurality of reasons-for-citing or rules are also present within each cited document. If the document is a legal document and the cited document is cited for a legal issue, there is usually a text area in the document that discusses the legal issue, and in most cases, the cited-text-area is located near another citation referencing another document. Therefore, there is a high likelihood that the reason-for-citing in the citing document is referring to a cited-text-area that corresponds to a reason-for-citing in the cited document. The CitedTextAreaID field is a cited-text-area identifier and commonly points to a reason-for-citing in the cited document.

The value present in the SimilarityValue field represents the relative semantic similarity between the text associated with the Reason-For-CitingID and the text associated with the CitedTextAreaID. The SimilarityValue will be described in more detail below.

An example of a citation entry included in a citation-pairing metadata file is provided below. It should be understood that the format and content of the exemplary citation entry may vary and embodiments are not limited thereto.

A72D7FE70BE40038:R_1::A26169830BE40246:R_5::0.832590108

In the above example, "A72D7FE70BE40038" is the citing-document identifier and may point to the case *Rolley, Inc. v. Merle Norman Cosmetics, Inc.*, 129 Cal. App. 2d 844, for example. R_1 is the reason-for-citing identifier and corresponds to the first reason-for-citing in the citing case. As described in more detail below, the Reason-For-CitingID may point to an entry in a separate reason-for-citing metadata file. In the above example, R_1 of citing document *Rolley, Inc.* may state that:

"Appellate courts cannot submit to piecemeal argument and will not consider on petition for rehearing questions not previously raised."

CitedCaseID A26169830BE40246 may point to the cited case *Bradley v. Bradley*, 94 Cal. App. 2d 310, for example. The CitedTextID of R_5 indicates that the cited-text-area of the cited case is the fifth reason-for-citing. R_5 may point to an entry in a reason-for-citing metadata file that the fifth reason-for-citing in Bradley states:

"The case having been tried on the theory that condonation was not an issue appellant under settled principles cannot now change his theory [***3] appeal to the disadvantage of respondent."

Therefore, the above exemplary citation entry states that "*Rolley, Inc. v. Merle Norman Cosmetics, Inc.*" cited "*Bradley v. Bradley*" for the legal issue of the ability for a party to raise new issues on appeal with a similarity measure between the two reasons-for-citing of about 0.8.

Figure 7:
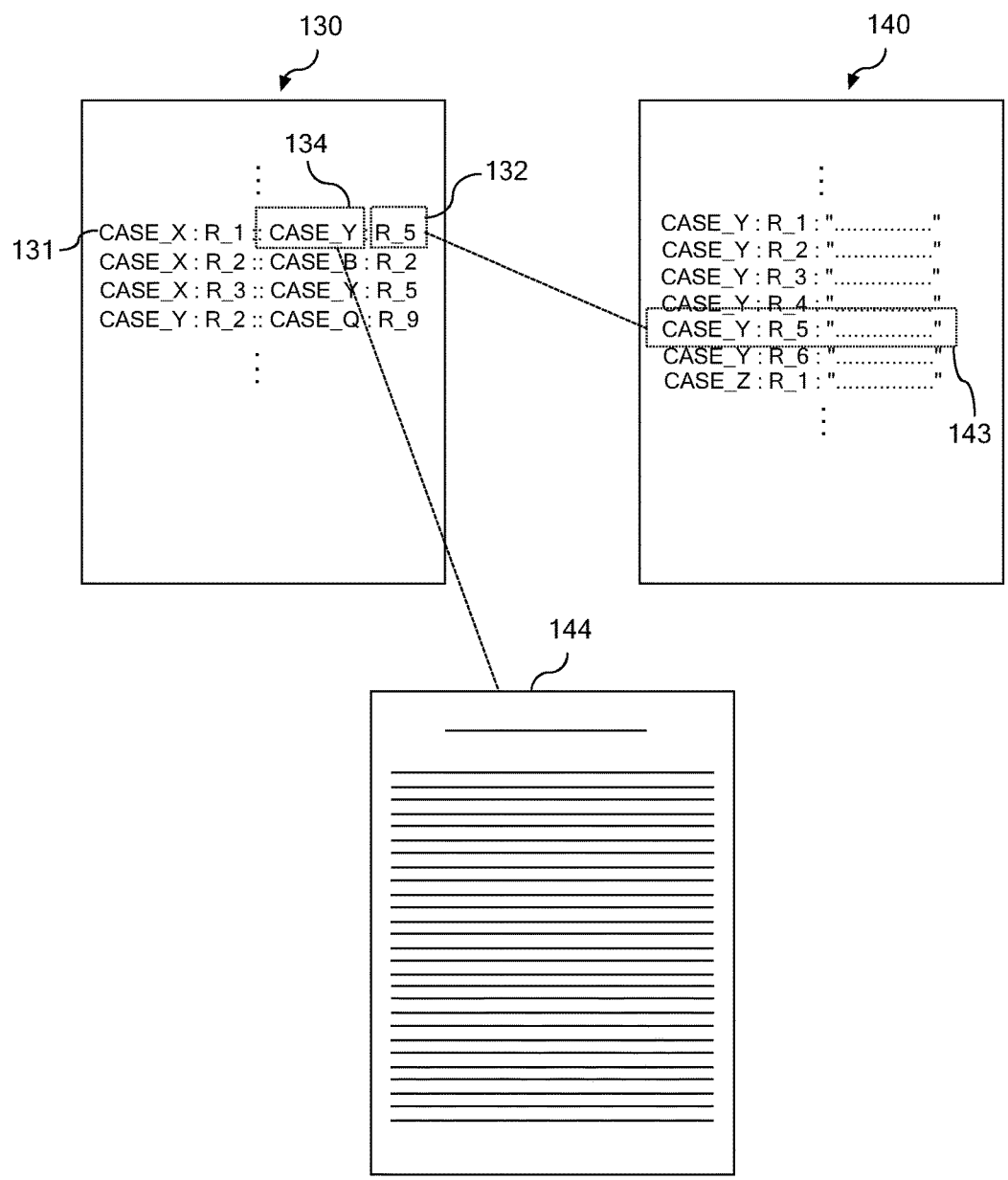
FIG. 7 depicts a schematic illustration of a document, a citation-pairing metadata file, a reason-for-citing metadata file, and relationships therebetween according to one or more embodiments shown and described herein.

Referring now to FIG. 7, a schematic illustration of a document 144, a citation-pairing metadata file 130 and a reason-for-citing metadata file 140 are illustrated. The document 144, citation-pairing metadata file 130 and reason-for-citing metadata file 140 are stored separately from one another. The citation-pairing metadata file 130 comprises a plurality of citation entries (e.g., citation entry 131). Depending on the size of the corpus, the citation-pairing metadata file 130 may have hundreds of thousands of citation entries. Each citation entry has semantic-pairing information associated therewith. The citation-pairing metadata file 130 may be accessed by a computer system to obtain information regarding passages relevant to particular issues or topics, or to find documents that discuss particular issues. As illustrated in FIG. 7, CASE_Y may contain linking information that, when accessed by an end-user and/or a computerized system, may retrieve the actual text of the document 144 corresponding to the CASE_Y CitedCaseID 134. For example, a user may initiate query using a software program configured to access the citation-pairing metadata file 130 to retrieve cases that cite a particular reason-for-citing.

The reason-for-citing metadata file 140 includes many reason-for-citing entries (e.g., reason-for-citing entry 143). The purpose of the reason-for-citing metadata file 140 is to provide the actual text string of reasons-for-citing associated with the documents in the corpus. As illustrated in FIG. 7, each reason-for-citing entry within the reason-for-citing metadata file 140 has information related to reasons-for-citing associated with each document in the corpus. In one embodiment, the reason-for-citing entry may have the following format:

CaseID: Reason-For-CitingID: Text_of_Reason-for-Citing

The CaseID may be the same document identifier described above, wherein the document identifier points to or is otherwise associated with a particular document in the corpus. The Reason-For-CitingID may be as described above and points to the particular reason-for-citing within the associated document. The Text_of_Reason-for-Citing contains the actual text string of the reason-for-citing (or cited-text-area) within the document. As shown in FIG. 7, each case may contain a plurality of reasons-for-citing/cited-text-areas. For example, "CASE_Y" has six reasons-for-citing. In one embodiment, all of the documents of the corpus are stored in a single reason-for-citing metadata file. Alternatively, more than one reason-for-citing metadata file may be used. In one embodiment, each document may have its own reason-for-citing metadata file.

The reason-for-citing metadata file 140 may be accessed via the citation-pairing metadata file 130 to obtain the text strings associated with reasons-for-citing and cited-text-areas within documents. In this manner, the citation-pairing metadata file 130 may be smaller in size because the text strings of each reason-for-citing/cited-text-area are not stored in the citation-pairing metadata file 130 but rather in the reason-for-citing metadata file.

Referring to FIG. 7 as an example, reason-for-citing/cited-text-area "R_5" of "CASE_Y" of the citation-pairing metadata file 130 (e.g., identifiers 134 and 132 of citation entry 131) may point to reason-for-citing entry 143 of the reason-for-citing metadata file 140. Reason-for-citing entry 143 is directed to the fifth reason-for-citing ("R_5") of the document CASE_Y. Reason-for-citing entry 143 also contains the text string of the reason-for-citing.

The citation-pairing metadata file and reason-for-citing metadata file enable the storage of voluminous amounts of data relating to documents, citations, related text passages and links in a relatively compact and easily-accessed format. The metadata is configured in such a way that allows for quick access and linking to support various software programs and applications, such as searching applications (e.g., more-like-this searching programs), issue libraries (i.e., groups of documents and/or issues/topics), and support of a citation network viewer in which the end-user may graphically view the citation network and sub-networks.

Software programs and applications may use the citation-pairing metadata file 130 and reason-for-citing metadata file 140 as described above to provide an end-user with the reasons-for-citing for the particular issues/topics he or she may be interested in. The end-user may perform a "more-like-this" search in which the software program accesses additional documents and reasons-for-citing related to the particular issue at hand.

Using the embodiments described herein, documents may be linked together beyond simple citation patterns alone or text matching alone. The metadata described herein can be used to link passages from different documents discussing the same topic/issue. It may give researches the ability to search document citations based on topics as well as citation. Embodiments may improve any search when an end-user is presented with a passage and hopes to find additional documents resembling the passage. Software programs using the embodiments described herein may proactively choose passages behind the scenes (using the citation-pairing metadata and reason-for-citing metadata) that are relevant to an end-user's search activities even when dissimilar language is used.

Figure 8:
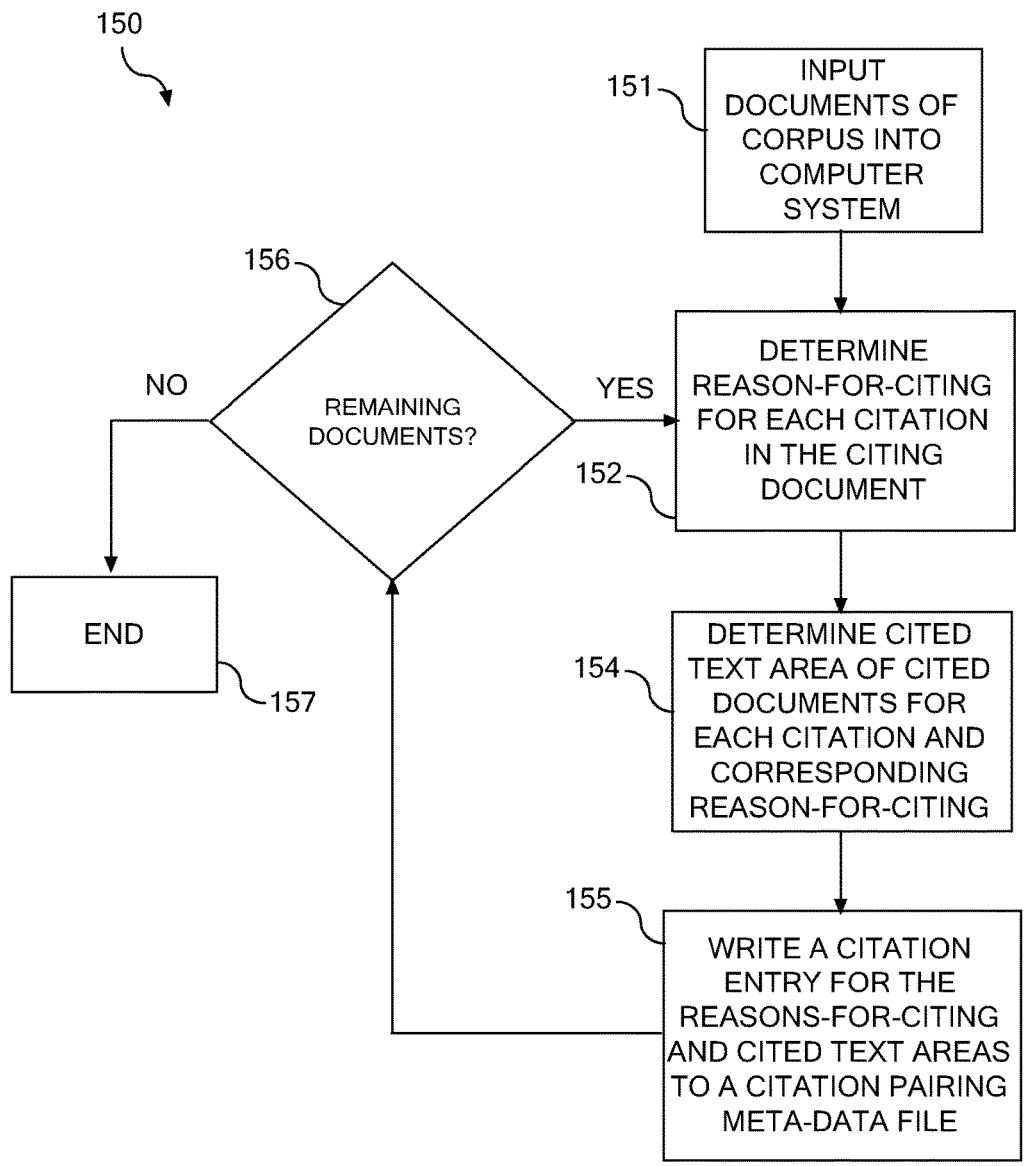
FIG. 8 depicts a flowchart illustration of a process for creating a citation-pairing metadata file according to one or more embodiments shown and described herein.
Figure 9:
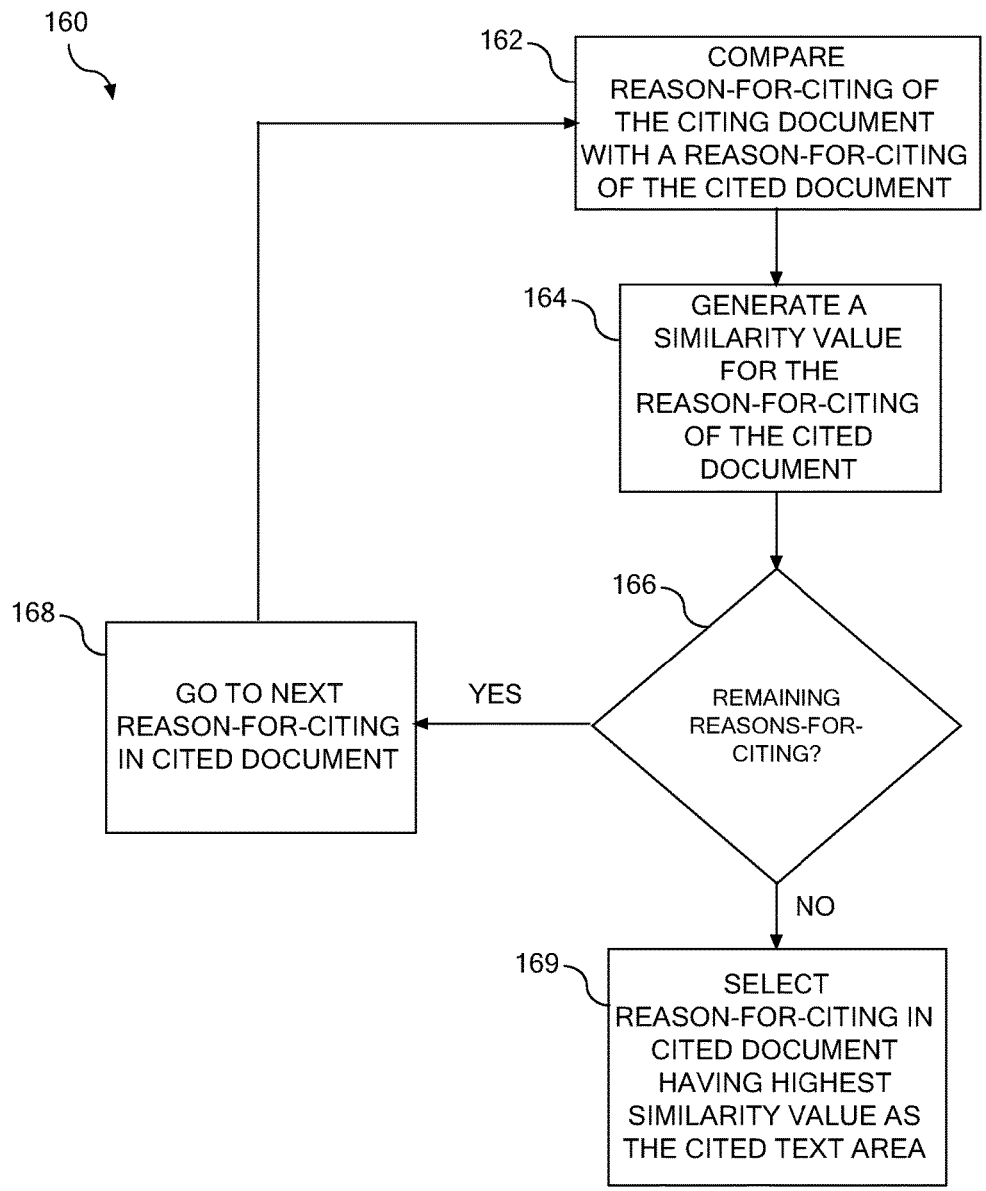
FIG. 9 depicts a flowchart illustration of a process for semantically pairing a reason-for-citing of a citing document with a cited-text-area of a cited document.

The creation of the pairing information and data that is populated into the citation-pairing metadata file will now be described. FIG. 8 illustrates a flowchart 150 that describes the process of creating the citation-pairing metadata file by populating the file with citation-pairing entries. The text of documents with a document corpus is input into a computer system at block 151. The computer system has computer code stored thereon that is operable to perform the various functions described herein. The corpus may be a legal corpus of a particular court or group of courts. For example, the legal corpus may be the all federal courts of appeals and the documents may be all judicial opinions (cases) associated with the federal courts of appeal. The corpus may also be a single court, such as the Court of Appeals for the Federal Circuit or the California Court of Appeal, for example. The legal corpus may also be an entire universe of legal opinions that span all state, federal and local courts.

At block 152, a reason-for-citing is determined for each citation within the document. The reasons-for-citing may be determined via the use of a reason-for-citing algorithm that is configured for identifying text in a citing court case near a citation (i.e., a citing instance), which indicates the reason(s) for citing. The reason-for-citing algorithm aids in the development of the citation-pairing metadata file by correctly locating reason-for-citing and cited-text-areas, as well as their respective boundaries within the document. One embodiment of a reason-for-citing algorithm is described in U.S. Pat. No. 6,856,988, which is incorporated herein by reference as though fully set forth in its entirety.

Generally, the reason-for-citing algorithm includes the steps of: obtaining contexts of the citations (i.e., citing instances) in the citing document (each context including text that includes the citation and the text that is near the citation), analyzing the content of the contexts, and selecting (from the citing instances' context) text that constitutes the reason-for-citing, based on the analyzed content of the contexts. The boundaries of the determined reasons-for-citing may be marked within the text of the document. For example, the boundaries may be marked with XML tags that delineate the text of the reasons-for-citing from the remaining text of the document. Subsequent processes, such as the processes described below, may use the XML tags or other markers to determine the locations of the various reasons-for-citing.

At block 154, the text area of a cited document that the citing document is citing is located. This step finds the text area in the cited document that is most semantically-equivalent to the reason-for-citing in the citing document. One method of determining the cited-text-area that is most semantically-equivalent to a reason-for-citing is described in U.S. Pat. No. 7,735,010. Generally, referring to the flowchart 160 of FIG. 9, the reasons-for-citing are determined in the cited document with the reasons-for-citing algorithm described above. The reasons-for-citing within the citing and cited documents are turned into vectors (e.g., by the use of key term extraction, lexical normalization, weighing, etc.). The vectors of the citing document and cited documents are paired and semantically compared with one another at block 162. A similarity value is established for each reason-for-citing within the cited document(s) at block 164. A vector comparison function may be used to measure the similarity between the two vectors. If there are remaining reasons-for-citing in the cited document(s) at block 166, the next reason-for-citing in a cited document is selected at block 168 and the process is repeated at block 162. If there are no more remaining reasons-for-citing at block 166, the reason-for-citing of a particular cited document having the highest similarity value is selected as the cited-text-area at block 169.

Referring once again to FIG. 8, after the cited-text-areas of the cited documents are determined at block 154, a citation entry is written for each reason-for-citing of the citing document into the citation-pairing metadata file at block 155. As described above, a citation entry contains information related to the citing document, the reason-for-citing of the citing document, the cited document, the reason-for-citing (or cited-text-area) of the cited document, and the similarity value. At block 156 it is determined whether or not there are remaining documents in the corpus. If yes, the process is repeated at block 152. If no, the process ends at block 157. In this manner, citation entries regarding semantically-paired documents and passages for each document in the corpus may be recorded in the citation-pairing metadata file.

As stated above, in the common law tradition, cases are normally argued with points or issues that are supported by legal precedents. Attorneys use citations to establish authority of the precedents in support of their propositions. In this regard, the citations and legal issues behind them form an approximate skeleton of a case. Against this background of normalized issues, such as legal issues discussed within a legal document corpus, the normalized issues may be used as units (i.e., nodes) within an issue network extracted from the document corpus.

With issues extracted, normalized, and indexed, additional data may be created underneath the cases data, where each case is represented by the issues it contains. More specifically, metadata may be created that stores vectors pointing to each issue discussed by individual cases within the corpus on a case-by-case basis. Such metadata is referred to herein as issues-by-case metadata. For example, a first case may discuss ten normalized issues extracted and stored in the issue library. The case identifier and the ten normalized issues may be stored in the issue-by-case metadata.

A non-limiting example of issues-by-case entry is provided below:

CaseID: Issue_Indentifier$_1$; Issue_Identifier$_2$; ... Issue_Identifier$_n$

The CaseID may be the same document identifier described above, wherein the document identifier points to or is otherwise associated with a particular document in the corpus. The Issue_Indentifier vectors point to the various normalized issues within the issue library discussed by the case identified by the CaseID. In this manner, the issues-by-case entry provides a listing of all of the normalized issues discussed by the text of the case or other type of document. Below is a non-limiting example of a sample issues-by-case metadata file in table-format:

TABLE 2

| CaseID | Issue_Identifier |
| --- | --- |
| CASE_00000001 | LLI_000055; LLI_000321; LLI_990175; ... |
| CASE_00000002 | LLI_000972; LLI_017543; LLI_100095; ... |
| CASE_00000003 | LLI_000055; LLI_000781; LLI_007850; ... |
| ... | ... |

As shown in the above example, the case having CaseID CASE_000000001 discusses as least normalized legal issues LLI_000055; LLI_000321; and LLI_990175, which are stored in the issue library metadata file. Accordingly, one may easily access information regarding all of the normalized issues discussed by each case in the corpus using the issues-by-case and issue library metadata.

The issues-by-case metadata is an extra-semantic structure that is superimposed onto the legal data. As described in more detail below, it may facilitate calculation of distance between cases in a new direction, i.e., based on the issues that they share as evidenced by a network of issues. This metadata may also provide for more efficient study of legal principles (or other principles), how they are used in legal arguments, and what kind of relationships they have among themselves, etc.

The collection of issues extracted from the document corpus may be seen as a condensed version of the knowledge within the corpus. In the legal context, each issue may be considered a small portion of the law. This may be especially important in legal systems that follows common law traditions because substantial areas of the law are not necessarily codified in the same manner one might find for other continental legal systems. Thus, for common law systems, the extracted legal issue library may serve as a particularly effective vehicle for the study of legal principles and their interactions.

Like other semantic units in legal data (e.g., concepts), legal issues are connected by citations and associated semantic elements. When they are used as basic operation units to form networks, much of the more profound legal knowledge that has not been easily seen may become apparent. In embodiments described herein, the relationships between extracted and normalized issues are determined and used to form a network of issues. In some embodiments, the issues-by-case metadata is data-mined to determine the co-occurrence of normalized issues within individual documents of the document corpus. Accordingly, the issue library metadata and the issues-by-case metadata may be used to generate an issue network that illustrated the connectedness of the various normalized issues extracted from the corpus.

One exemplary method of generating an issue network is to evaluate the normalized issues discussed by the cases. Normalization of the issues allows issues and related issues discussed within the corpus to be data-mined. For example, a method may start with a starting issue to locate all of the cases within the corpus that discusses the starting issue (i.e., a set of cases). As each case within the set of cases discusses a plurality of issues, the method may determine some or all of the issues discussed by each case that discusses the starting issue (i.e., a set of normalized issues). To create the issue network, co-occurrences of the normalized issues within individual cases may be determined by computer processing. The number of issues co-occurring together within individual cases indicates the strength of the connection between the two issues, which act as nodes within the issue network. In some embodiments, only those co-occurrences that appear greater than or equal to a co-occurrence threshold (e.g., a number of times, or within a percentage of the set of documents) are included in the extracted network or sub-network. In this manner, issues that co-occur within only a few cases may be excluded.

It should be understood that the issues may be extracted and normalized using the processes described above (i.e., using reason-for-citing and issue library metadata) or by other processes. The issues may be normalized in a manner other than those described herein.

As an example, the issues-by-case metadata file may be data-mined to find the co-occurrences of normalized issues within cases. Referring to Table 2 above, the cases represented by CASE_000000001 and CASE_000000003 each share the legal issue represented by LLI_000055, which points to a particular normalized issue in the legal issue library, and which, without limitation, may be represented by an entry having a format as described above (e.g., sample text, instances, taxonomy information, etc.). The co-occurrence of normalized issues may be determined using metadata or information other than the issues-by-case metadata described above. A map may be generated that links the related normalized issues together, wherein the strength of the relationship between individual normalized issues may be graphically depicted.

Issues-by-case metadata described above was searched using a starting issue relating to the normalized issue "Motivation Element Required for Robbery" (LLI_001) to generate an issue network (or a sub-network of a larger issue network). It should be understood that the example described below is for illustrative purposes and that embodiments are not limited thereto. United States state and federal case law was searched. About seventy cases were found to discuss the starting issue LLI_001. These seventy cases discussed about 4,000 normalized issues according to the issues-by-case metadata. The following normalized issues were shown to be related (i.e., co-occur together within cases):

LLI_001 (Starting Issue): "In order to constitute robbery rather than theft, the act of force or intimidation must be motivated by the intent to steal; if the larcenous purpose does not arise until after the force has been used against the victim, there is no joint operation of act and intent necessary to constitute robbery."

LLI_002: "A reviewing court must 'review the whole record in the light most avorable to the judgment below to determine whether it discloses substantial evidence—that is, evidence which is reasonable, credible, and of solid value—such that a reasonable trier of fact could find the defendant guilty beyond a reasonable doubt."

LLI_009: "Prejudice is shown when there is a 'reasonable probability that, but for counsel's unprofessional errors, the result of the proceeding would have been different. A reasonable probability is a probability sufficient to undermine confidence in the outcome."

LLI_011: "The quantum of evidence the people must produce in order to satisfy the corpus delicti rule is quite modest; case law describes it as a slight or prima facie showing."

LLI_012: "The intentional commission of the underlying felony is not only an essential element of the crime of first degree felony murder; it is the sole basis for holding the killing is murder in the first degree."

LLI_017: "Robbery is defined as the 'felonious taking of personal property in the possession of another, from his person or immediate presence, and against his will, accomplished by means of force or fear.'"

LLI_027: "Conduct by a prosecutor that does not render a criminal trial fundamentally unfair is prosecutorial misconduct under California law only if it involves the use of deceptive or reprehensible methods to attempt to persuade either the court or the jury."

LLI_048: "The force or fear element of robbery may be directed either to the initial taking of the property or to its asportation. Thus, even when the intent to steal arises after the use of force or fear, the offense is robbery and not theft if the force or fear was used to escape with the property."

LLI_147: "The trial court has a sua sponte duty to instruct on lesser included offenses when the evidence raises a question as to whether all of the elements of the charged offense were present and there is evidence that would justify a conviction of such a lesser offense."

LLI_196: "A defendant claiming ineffective assistance of counsel must first establish that 'counsels' representation fell below an objective standard of reasonableness . . . [P] . . . under prevailing professional norms."

LLI_213: "The trial court is required to instruct sua sponte only on general principles of law relevant to issues raised by the evidence and on particular defenses when a defendant appears to be relying on such defense and there is substantial evidence to support it."

LLI_264: "An error in failing to instruct on lesser included offenses requires reversal unless it can be determined that the factual question posed by the omitted instruction was necessarily resolved adversely to the defendant under other, properly given instructions."

It should be understood that the issue identifiers provided above are used for illustrative purposes only.

Figure 10:
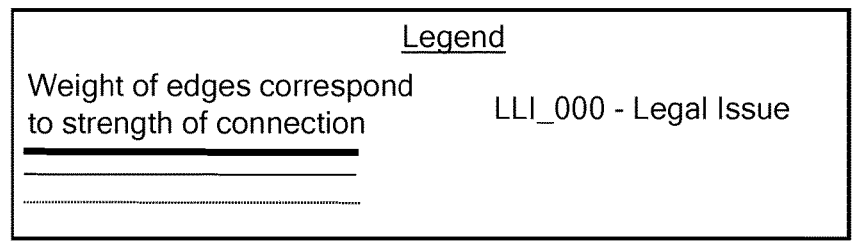
FIG. 10 depicts an exemplary graphical representation of an issue network extracted from a document corpus.
Figure 10:
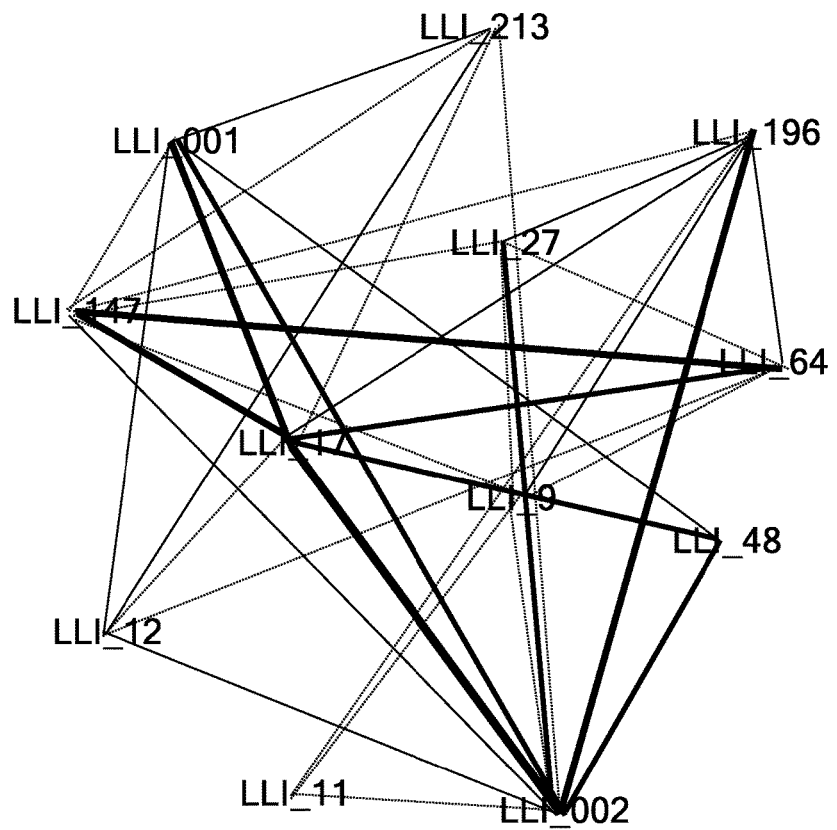

As noted above, these disparate issues form a small sub-network, which is part of the general legal issue network of United States law, where nodes (i.e., issues) are linked by edges. FIG. 10 provides a graphical representation of the network or sub-network of legal issues extracted from the corpus as described above. The graphical representation of an extracted network or sub-network may be displayed on a display device, such as a computer monitor. The weight of the edges (i.e., thickness of the lines connecting the nodes) provides visual feedback as to the strength of the connection between connected issues. Accordingly, as shown in the sample issue sub-network or network, not all members of the network play equally strong roles in establishing network cohesion.

Even within a network or sub-network, smaller sub-networks may be identified. For example, from the network depicted in FIG. 10, the "Definition of Robbery (LLI_017) has a stronger connection to the Starting Issue (LLI_001). It also has a stronger connection to a few other issues, such as "Review of Evidence" (LLI_002), and "Use of Force" (LLI_048). The issue "Court's Duty to Instruct on the Lesser" (CL_147) has a stronger connection to "Required Reversal or Resolution When Error is Made with that Respect" (LLI_264).

In the legal context, attorneys and judges use legal issues in their arguments. The selection and use of these issues influences, to a large extent, the outcome of cases and the development of the common law. The legal issue metadata described herein may provide a way to study into the logical thinking and strategy behind the argument of cases. Legal experts may also find it useful as to when and how cases share the same set of issues when formulating their respective argument strategies. The issue networks described herein may provide legal experts with a tool to find such cases.

As an example and not a limitation, based on the small network described above and illustrated in FIG. 10, two cases showed particularly high overlap of issue usage (i.e., the discussion of common issues). Specifically, "*PEOPLE v. CANTWELL*, 2004 *Cal. App. Unpub LEXIS* 1833" and "*People v. Frye*, 18 *Cal.* $4^{th}$ 894" discussed the following normalized issues identified from the network:

LLI_002: "A reviewing court must 'review the whole record in the light most favorable to the judgment below to determine whether it discloses substantial evidence—that is, evidence which is reasonable, credible, and of solid value—such that a reasonable trier of fact could find the defendant guilty beyond a reasonable doubt."

LLI_017: "Robbery is defined as the 'felonious taking of personal property in the possession of another, from his person or immediate presence, and against his will, accomplished by means of force or fear.'"

LLI_027: "Conduct by a prosecutor that does not render a criminal trial fundamentally unfair is prosecutorial misconduct under California law only if it involves the use of deceptive or reprehensible methods to attempt to persuade either the court or the jury."

LLI_196: "A defendant claiming ineffective assistance of counsel must first establish that 'counsels' representation fell below an objective standard of reasonableness . . . [P] . . . under prevailing professional norms."

Legal experts may find this higher degree of issue-sharing evidenced by the extracted network as an indication of two cases sharing similar factual patterns, similar argument strategies, or both.

It should be understood that embodiments described herein are directed to systems and methods of extracting and building of both issue libraries and issue networks. Such collections may be seen as a summary or condensed version of knowledge found within the corpus of documents. The issue network(s) may serve as an added semantic layer for the corpus, and may serve as well as a foundation for different semantics-based research tools. The extracted network may provide practitioners with an understanding of how various issues are related, which may assist in the development of strong legal arguments.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer program for generating an issue network from a document corpus comprising instructions which, when the program is executed by a computer, cause the computer to carry out steps comprising:
   searching the document corpus for a set of documents discussing a starting issue, wherein the starting issue is one of a plurality of normalized issues defined by the document corpus;
   determining a set of normalized issues discussed by the set of documents discussing the starting issue, wherein the set of normalized issues also includes the starting issue;
   determining instances of co-occurrences of individual normalized issues of the set of normalized issues within individual cases of the set of documents;
   linking individual normalized issues of the set of normalized issues based on their co-occurrences within the set of documents, wherein the linked individual normalized issues at least in part define the issue network; and
   storing the linked individual normalized issues in a non-transitory computer-readable medium.

2. The computer program of claim 1, further comprising providing for display a graphical representation of the issue network on a display device, wherein the graphical representation of the issue network comprises nodes representing individual normalized issues of the set of normalized issues, and edges linking the nodes based on the co-occurrences of the individual normalized issues within individual documents within the set of documents.

3. The computer program of claim 2, wherein each edge provides a visual representation of a strength of a link between two nodes based on a number of co-occurrences between two individual issues represented by the two nodes.

4. The computer program of claim 3, wherein the visual representation comprises a weighted line representing the edge.

5. The computer program of claim 2, where in the nodes represent individual normalized issues of the set of normalized issues that co-occur within the individual documents above a co-occurrence threshold.

6. The computer program of claim 1, further comprising normalizing issues discussed in the document corpus.

7. The computer program of claim 6, further comprising storing normalized issues in an issue library metadata file.

8. The computer program of claim 6, wherein normalizing the issues discussed in the document corpus comprises:
   semantically linking, by a computing device, documents within the document corpus by pairing reasons-for-citing in citing documents with cited-text-areas in cited documents, wherein a cited-text-area in a cited document is a text area that has a highest similarity value of text present within the cited document;
   creating a group of semantically-similar reasons-for-citing and cited-text-areas that are semantically similar to at least one issue; and
   storing information regarding groups of semantically-similar reasons-for-citing and cited-text-areas in an issue library metadata entity, wherein each issue library metadata entity is associated with an individual issue.

9. The computer program of claim 1, further comprising creating at least one issues-by-case metadata file, wherein the searching of the document corpus for the set of documents discussing the starting issue, the determining of the set of normalized issues discussed by the set of documents discussing the starting issue, and the determining of the instances of co-occurrences of individual normalized issues of the set of normalized issues within individual cases of the set of documents comprises searching the at least one issues-by-case metadata file.

10. The computer program of claim 9, wherein the at least one issues-by-case metadata file comprises at least one entry comprising a case identifier and one or more issue identifiers.

11. A computer program for generating an issue network from a document corpus comprising instructions which, when the program is executed by a computer, cause the computer to carry out steps comprising:
   searching the document corpus for a set of documents discussing a starting issue, wherein the starting issue is one of a plurality of normalized issues defined by the document corpus;
   determining a set of normalized issues discussed by the set of documents discussing the starting issue, wherein the set of normalized issues also includes the starting issue;
   determining instances of co-occurrences of individual normalized issues of the set of normalized issues within individual cases of the set of documents;
   linking individual normalized issues of the set of normalized issues based on their co-occurrences within the set of documents, wherein the linked individual normalized issues at least in part define the issue network; and
   providing for display a graphical representation of the issue network on a display device, wherein the graphical representation of the issue network comprises nodes representing individual normalized issues of the set of normalized issues, and edges linking the nodes based on the co-occurrences of the individual normalized issues within individual documents within the set of documents.

12. The computer program of claim 11, wherein each edge provides a visual representation of a strength of a link between two nodes based on a number of co-occurrences between two individual issues represented by the two nodes.

13. The computer program of claim 12, wherein the visual representation comprises a weighted line representing the edge.

14. The computer program of claim 11, where in the nodes represent individual normalized issues of the set of normalized issues that co-occur within the individual documents above a co-occurrence threshold.

15. The computer program of claim 11, further comprising normalizing issues discussed in the document corpus.

16. The computer program of claim 15, further comprising storing normalized issues in an issue library metadata file.

17. The computer program of claim 15, wherein normalizing the issues discussed in the document corpus comprises:
   semantically linking, by a computing device, documents within the document corpus by pairing reasons-for-citing in citing documents with cited-text-areas in cited documents, wherein a cited-text-area in a cited document is a text area that has a highest similarity value of text present within the cited document;

creating a group of semantically-similar reasons-for-citing and cited-text-areas that are semantically similar to at least one issue; and storing information regarding groups of semantically-similar reasons-for-citing and cited-text-areas in an issue library metadata entity, wherein each issue library metadata entity is associated with an individual issue.

18. The computer program of claim 11, further comprising creating at least one issues-by-case metadata file, wherein the searching of the document corpus for the set of documents discussing the starting issue, the determining of the set of normalized issues discussed by the set of documents discussing the starting issue, and the determining of the instances of co-occurrences of individual normalized issues of the set of normalized issues within individual cases of the set of documents comprises searching the at least one issues-by-case metadata file.

19. The computer program of claim 18, wherein the at least one issues-by-case metadata file comprises at least one entry comprising a case identifier and one or more issue identifiers.

20. The computer program of claim 11, further comprising storing the linked individual normalized issues in a non-transitory computer-readable medium.

\* \* \* \* \*